United States Patent [19]

Nurnberg

[11] B 4,000,450
[45] Dec. 28, 1976

[54] LUBRICANT PRESSURE RESPONSIVE CONTROL CIRCUIT

[75] Inventor: Richard K. Nurnberg, Norristown, Pa.

[73] Assignee: Robertshaw Controls Company, Richmond, Va.

[22] Filed: Mar. 15, 1974

[21] Appl. No.: 451,396

[44] Published under the second Trial Voluntary Protest Program on April 13, 1976 as document No. B 451,396.

[52] U.S. Cl. .............................. 318/481; 318/484; 317/14 G; 307/118; 62/158

[51] Int. Cl.² .................. F25B 43/02; G05B 13/00

[58] Field of Search ........... 307/118; 318/481, 484; 317/14 G, 141 S; 62/158

[56] References Cited

UNITED STATES PATENTS

| | | | |
|---|---|---|---|
| 3,673,811 | 7/1972 | Adams et al. | 62/158 |
| 3,716,756 | 2/1973 | Runge | 318/484 X |
| 3,796,061 | 3/1974 | Weihl | 318/484 X |
| 3,801,889 | 4/1974 | Quinn | 318/481 |

*Primary Examiner*—B. Dobeck
*Attorney, Agent, or Firm*—Anthony A. O'Brien

[57] ABSTRACT

A control circuit for a motor has an electronic RC timing circuit with a fluid pressure switch for shunting the timing circuit if the fluid pressure reaches and maintains a predetermined magnitude. The timing circuit terminates the energization of the motor when not shunted for a predetermined duration.

11 Claims, 1 Drawing Figure

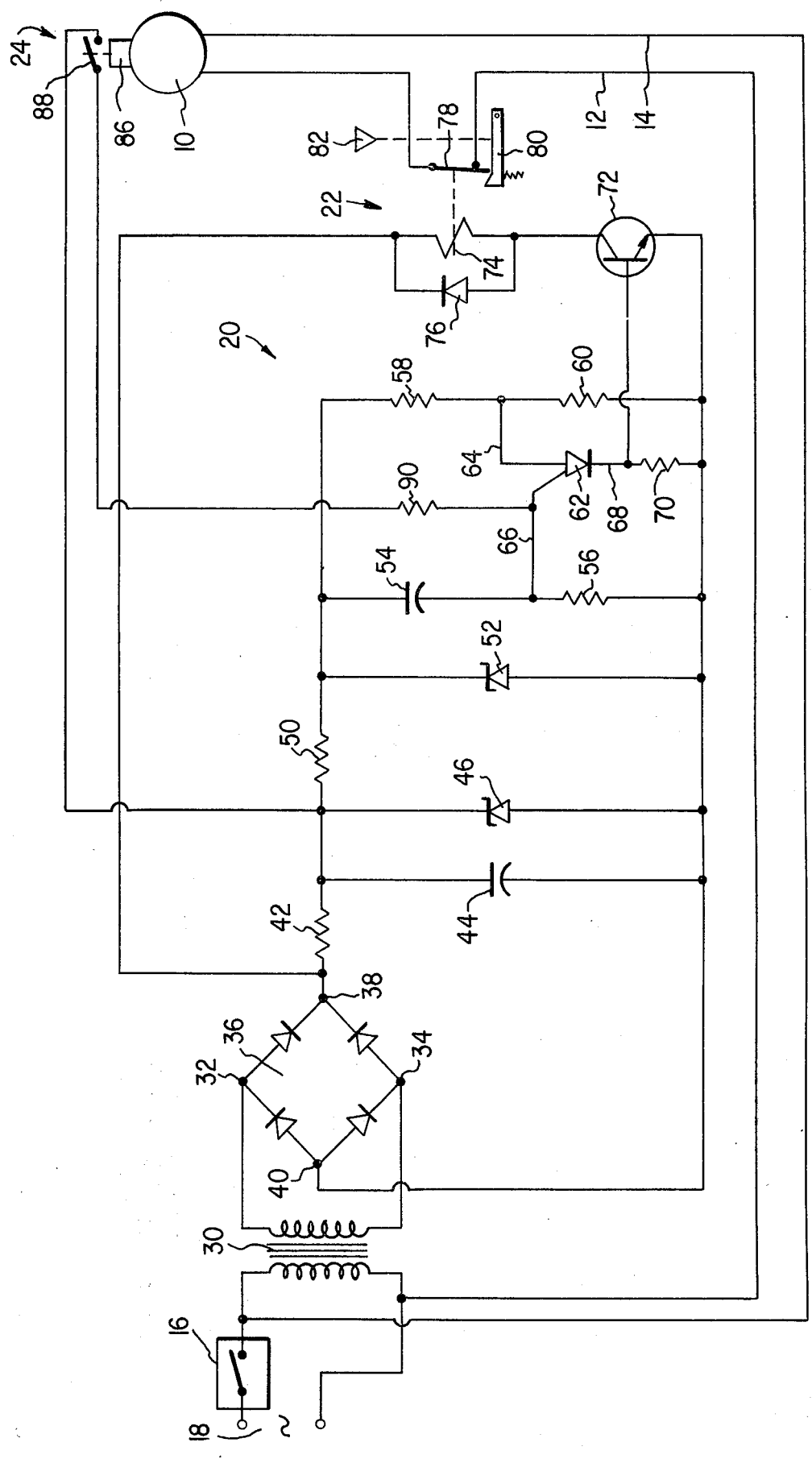

LUBRICANT PRESSURE RESPONSIVE CONTROL CIRCUIT

BACKGROUND OF THE INVENTION

1. Field of the Invention

The invention relates to motor protector circuits, and in particular, to lubricating fluid pressure responsive control circuits for interrupting energization of a motor in the absence of a suitable pressure in a lubricating fluid.

2. Description of the Prior Art

The prior art, as exemplified in U.S. Pat. Nos. 3,102,677, 3,290,576, 3,673,811 and 3,787,793, contains a number of motor control circuits responsive to fluid flow or pressure, such as lubricating fluid pressure in a refrigeration motor compressor apparatus. Generally the prior art control circuits for fluid lubricant pressure sensing have one or more deficiencies such as being expensive to manufacture or install, being unduly complex, and being subject to unreliable operation.

As exemplified in U.S. Pat. Nos. 3,435,298, 3,638,091, 3,648,074, 3,652,916, 3,681,671, 3,688,130, 3,694,669, 3,712,991, 3,749,992, and 3,769,529, the prior art contains a number of different motor control circuits and timing circuits, some of which employ semiconductive elements, including programmable unijunction transistors, for sensing the charge on a capacitance; however such timing circuits are not capable of terminating operation of a motor when there is a failure of fluid lubricant pressure.

SUMMARY OF THE INVENTION

The invention is summarized in that a motor control circuit includes means responsive to energization of the control circuit for supplying a unipolarity voltage across a pair of nodes, a timing resistance, a timing capacitance, said timing resistance and said timing capacitance being connected in a series circuit across the pair of nodes, switch means having first and second terminals and being responsive to a predetermined lubricating fluid pressure for opening and closing a conductive path between the first and second terminals, said first and second terminals and said timing capacitance being connected in a closed loop circuit, sensing means including a voltage responsive semiconductor device connected to the timing capacitance for sensing a predetermined charge condition of the capacitance, and means capable of terminating operation of a motor in response to the sensing means.

An object of the invention is to construct a lubricating fluid pressure responsive motor control circuit which is reliable, relatively inexpensive and easy to manufacture.

Another object of the invention is to provide a timing circuit which is responsive only to a predetermined duty cycle of an intermittently operated switch.

It is also an object of the invention to construct a series RC timing circuit operated by both a series control and a shunt control, which includes a discharge resistance wherein there are provided facilities for establishing a predetermined time relationship between the duration of the timing circuit when operated by the series control and the duration of the timing circuit when operated by the shunt control.

Additional features of the invention include the provision of a magnetic relay having latching means for interrupting the operation of a motor; the provision of a PNPN semiconductor device having an anode electrode connected to a voltage divider and a gate electrode connected to the junction of an RC timing circuit to operate motor interrupting facilities; the provision of a resistor in series with a normally open lubricating fluid pressure responsive switch across a charging capacitance for providing a discharge time having a predetermined relationship to the charging time of the capacitance; and the provision of unidirectional voltage facilities producing two different regulated voltages for providing alternate charging conditions through alternate circuits for a timing capacitance.

BRIEF DESCRIPTION OF THE DRAWING

The DRAWING is a diagram of a circuit constructed in accordance with the invention.

DESCRIPTION OF THE PREFERRED EMBODIMENT

As illustrated in FIG. 1, the invention is embodied in a circuit for controlling a pressure lubricated device, such as a refrigeration motor and compressor unit 10. The unit 10 may include suitable facilities, such as a power contactor (not shown), which are energized by lines 12 and 14 connected in series with a control device, such as a thermostatic switch 16, across a power source, such as a 120 volt 60 hertz alternating current (AC) source 18. A timing circuit, indicated generally at 20, operates a magnetic latching relay, indicated generally at 22, controlling current in the lines 12 and 14 in accordance with a lubricating fluid pressure responsive switch, indicated generally at 24.

The control circuit includes a step down transformer 30 having a secondary winding connected across AC input nodes 32 and 34 of a diode bridge circuit 36 which produces a unipolarity voltage on output nodes 38 and 40. The positive output node 38 is connected by a resistor 42 to one side of a filter capacitance 44 which has its other side connected to the negative node 40. The anode electrode of a zener diode 46 is connected to the node 40 and the cathode electrode of the zener diode 46 is connected to the junction of the capacitance 44 and the resistance 42. The zener diode 46 is a voltage regulation diode which has a voltage characteristic selected to maintain a first predetermined voltage, for example 20 volts, across the capacitance 44.

A resistance 50 is connected between the cathode electrode of the diode 46 and the cathode electrode of a second zener diode 52 which has its anode electrode connected to the negative node 40. The zener diode 46 is a voltage regulation diode which has a voltage characteristic selected to maintain a second predetermined voltage, for example 20 volts, across its electrodes, and thus to maintain a predetermined voltage drop across the resistance 50 for example 2 volts. One side of a capacitance 54 is connected to the junction of the resistance 50 and the diode 52, and the other side of the capacitance 54 is connected to one end of a resistance 56 which has its other end connected to the node 40. A voltage divider including resistors 58 and a resistor 60 is also connected across the zener diode 52.

A semiconductor switching device, such as a programmable unijunction transistor (PUT) 62, has a anode electrode 64 connected to the junction of the resistors 58 and 60 and has a gate electrode connected to the junction of the capacitor 54 and the resistor 56. The PUT 62 is a PNPN semiconductor device wherein current through a PN junction between the anode electrode 64 and the gate electrode 66 initiates avalanche current flow between the anode electrode 64 and a cathode electrode 68. The cathode electrode 68 is connected to the base electrode of a NPN transistor 72 and is connected by a resistor 70 to the negative node 40.

The NPN transistor has its emitter electrode connected to the node 40 and its collector electrode connected in series with an energizing coil 74 of the latching relay 22 to the node 38. A protective diode 76 is connected across the winding 74 of the latching relay 22.

The relay 22 has a pair of normally closed contacts 78 and latching means 80 which latch the contacts 78 in the open position when the winding 74 is energized. Also the relay 22 has reset means 82 which can be manually operated to release the latching means 80 and allow the contacts 78 to return to their normally closed condition.

The lubricating fluid pressure sensitive switch 24 has a switch operating member 86 which is operated by the pressure of a fluid lubricant in the unit 10 exceeding a predetermined pressure for closing normally open contacts 88. The normally open contacts 88 are connected in series with a resistance 90 across the resistance 50 and the capacitance 54.

In operation of the control circuit for the motor and compressor unit 10, the operation of the control device 16 energizes the lines 12 and 14 which in turn energizes the unit 10. Simultaneously the transformer 30 is energized which initiates the timing circuit 20 which will operate the latching relay 22 after a predetermined duration in the event the switch 24 has not been operated by a lubricating fluid pressure exceeding the predetermined pressure. Operation of the relay 22 opens the contacts 78 terminating the energization of the unit 10 and thus preventing damage to the unit 10 due to insufficient lubrication.

When the secondary of the transformer 30 is energized, the diode bridge circuit 36 rectifies the AC voltage applied to the input nodes 32 and 34 produces a unidirectional voltage on output nodes 38 and 40, that is a positive voltage on the node 38 and a negative voltage on the node 40. Positive current passes through resistance 42 and charges capacitor 44 to a voltage determined by voltage characteristics of the zener diode 46. Current through the resistance 50 produces a voltage across the zener diode 52 determined by its voltage characteristics.

Initially the capacitance 54 has no charge and hence has zero voltage across its terminals causing the gate electrode 66 of the PUT 62 to be at a positive voltage relative to the voltage applied to the anode electrode 64 by the voltage divider consisting of resistors 58 and 60. Current through the resistance 56 charges the capacitance 54 producing a negative voltage on the side of the capacitance 54 connected to the electrode 66 relative to the side of the capacitance 54 connected to the diode 52.

If the unit 10 has sufficient lubricating fluid pressure the operator 86 closes the contacts 88 connecting the resistance 90 shunting the capacitor 54 and the resistor 50. This prevents any further charging of the capacitor 54 and discharges the capacitor 54 through the resistance 90 to prevent the gate electrode 66 becoming negative relative to the anode electrode 64 of the PUT 62.

In the event the operator 86 does not close the contacts 88 within a predetermined time period, the charge on the capacitor 54 will reach a value which renders the gate electrode 66 sufficiently negative relative to the anode electrode 64 to trigger the PUT 62 in conduction. Current from the cathode electrode 68 of the PUT will produce a positive voltage across resistance 70 which drives the transistor 72 into conduction passing current through the coil 74 which opens the contacts 78 in series with the energizing lines 12 and 14 deenergizing the unit 10. The unit 10 will remain deenergized as long as the contacts 78 are held open by the latching means 80. After proper maintenance or repairs are made, the reset means 82 may be operated disengaging the latching means 80 and allowing the contacts 78 to close.

In the event the switch 24 is intermittently operating indicating intermittent operation of the lubricating fluid pressure facilities for the unit 10, the contacts 88 will intermittently open and close. The resistance 90 has a value designed to discharge the capacitance 54 in a predetermined rate relative to the charging time of the capacitance 54 through the resistance 56. For example, the discharge time may be one-tenth the time required to charge the capacitance 54. Thus the PUT 62 will not be rendered conductive unless the contacts 88 are open more than about 90% of the time indicating that the lubricating fluid pressure is sufficient less than about 10% of the time.

The resistance 90 further has a value selected to be a certain percentage of the value of the resistance 56 to produce a voltage divider with the resistance 56 across the junction of the resistance 42 and the capacitance 44 and the node 40. Thus the voltage drop across the resistance 90 has a value determined by the relative values of the resistances 90 and 56. This voltage drop across the resistance 90 further has a value selected to have a predetermined relationship to the predetermined voltage drop across the resistance 50. For example, the voltage drop across the resistance 90 is made about equal to the voltage drop across the resistance 50, thus producing a zero voltage or charge on the capacitance 54 and the same time of operation upon opening of the switch 88 as the time of operation upon initiation of the energization of the timing circuit 20.

It is advantageous that the lubricating fluid pressure responsive circuit incorporates an RC timing circuit for operating the semiconductive device 62. The values of the resistance and the capacitance can be selected with a wide variation thus enabling a wide selection in the design of the circuit to meet different requirements for the protection of motor circuits. Semiconductor devices have relatively low current input requirements which particularly makes possible the use of an RC timing circuit and the sensing of the capacitance charge in lubricating fluid pressure responsive control circuits.

Since many modifications, variations and changes in detail may be made to the above described embodiment, it is intended that all manner shown in the foregoing description and the accompanying drawing be interpreted as illustrative and not in a limiting sense.

What is claimed is:
1. A motor control circuit comprising
means responsive to energization of the control circuit for supplying a unipolarity voltage across a pair of nodes,
a timing resistance,
a timing capacitance, said timing resistance and said timing capacitance being connected in a series circuit across the pair of nodes, switch means having first and second terminals and being responsive to a predetermined lubricating fluid pressure for opening and closing a conductive path between the first and second terminals, said first and second terminals and said timing capacitance being connected in a closed loop circuit excluding the timing resistance, sensing means including a voltage responsive semiconductor device connected to the timing capacitance for sensing a predetermined charge condition of the capacitance, and means capable of terminating operation of a motor in response to the sensing means including a magnetic latching relay having a winding energized in response to the sensing means, a pair of contacts which are opened when the winding is energized, means for maintaining the pair of contacts open after the winding is deenergized, and means for allowing the manual reclosing of the pair of contacts.

2. A motor control circuit as claimed in claim 1 wherein
the closed loop circuit includes a resistance for determining a discharge time for the timing capacitance.

3. A motor control circuit as claimed in claim 2 wherein the resistance in the closed loop includes a resistance shunting a portion of the series circuit including the timing capacitor when the switch means is closed.

4. A motor control circuit as claimed in claim 1 wherein
there is included a second resistance in series with the timing resistance and the timing capacitance and
the closed loop circuit includes the second resistance.

5. A motor control circuit comprising
means responsive to energization of the control circuit for supplying a unipolarity voltage across a pair of nodes,
a timing resistance,
a timing capacitance,
said timing resistance and said timing capacitance being connected in a series circuit across the pair of nodes,
switch means having first and second terminals and being responsive to a predetermined lubricating fluid pressure for opening and closing a conductive path between the first and second terminals,
said first and second terminals and said timing capacitance being connected in a closed loop circuit,
sensing means including a voltage responsive semiconductor device connected to the timing capacitance for sensing a predetermined charge condition of the capacitance,
means capable of terminating operation of a motor in response to the sensing means,
a second resistance in series with the timing capacitance and the timing resistance,
said closed loop circuit including the second resistance,
a third resistance which is connected in the loop circuit for shunting the second resistance and the capacitance when the switch means is closed, and
means for maintaining a predetermined voltage drop across the second resistance, whereby the timing capacitance is rendered toward a predetermined voltage condition by current through the third resistance.

6. A motor control circuit as claimed in claim 5 wherein
the predetermined voltage condition of the timing capacitance is a substantially 0 voltage.

7. A motor control circuit as claimed in claim 5 wherein
the means for maintaining a predetermined voltage drop across the first resistance includes
a first voltage regulating diode connected between one side of the second resistance and one of the pair of output nodes, and
a second voltage regulating diode connected between the other side of the second resistance and the one output node,
said first and second voltage regulating diodes having respective and different voltage characteristics for maintaining the predetermined voltage drop across the second resistance.

8. A motor control circuit comprising
means responsive to energization of the control circuit for supplying a unipolarity voltage across a pair of nodes,
a timing resistance,
a timing capacitance,
said timing resistance and said timing capacitance being connected in series circuit across the pair of nodes,
switch means having first and second terminals and being responsive to a predetermined lubricating fluid pressure for opening and closing a conductive path between the first and second terminals,
said first and second terminals and said timing capacitance being connected in a closed loop circuit,
sensing means including a voltage responsive semiconductor device connected to the timing capacitance for sensing a predetermined charge condition of the capacitance, and
means capable of terminating operation of a motor in response to the sensing means,
said sensing means including second and third resistances connected in a series circuit across the timing capacitance and the timing resistance, and
said semiconductor device including first and second input electrodes, the first input electrode being connected to a junction between the timing capacitance and the timing resistance and the second input electrode being connected to a junction between the second and third resistances.

9. A motor control circuit as claimed in claim 8 wherein the semiconductor device is a PNPN semiconductor having an anode electrode, a cathode electrode and a gate electrode for triggering conductivity between the anode and cathode electrodes, said gate electrode being one of the first and second input electrodes.

10. A control circuit for an alternating current electric refrigerating motor and compressor lubricated by a pressurized fluid lubricant, said control circuit comprising
an energization circuit including control switch means for the motor;
a step-down voltage transformer including a primary winding connected across the energization circuit and a secondary winding;

a full wave rectifier circuit having alternating current input nodes connected across the secondary winding of the transformer and positive and negative direct current output nodes;

a first resistance having one end connected to the positive output node of the rectifier circuit;

a filter capacitance connected at its one side to the other end of the first resistance, the other side of the capacitance connected to the negative output node of the rectifier circuit;

a first voltage regulating diode connected across the filter capacitance for limiting the voltage across the filter capacitance to a first predetermined voltage;

a second resistance connected at one end to the junction of the first resistance and the filter capacitance;

a second voltage regulating diode having its cathode connected to the other end of the second resistance and having its anode connected to the negative output node of the rectifier circuit;

said second voltage regulating diode having a voltage characteristic limiting the voltage across the second voltage regulating diode to a second predetermined voltage;

said second predetermined voltage being less than the first predetermined voltage;

a timing capacitance having one side connected to the junction of the second resistance and the cathode of the second voltage regulating diode;

a third resistance connected between the other side of the timing capacitance and the negative output node of the rectifier circuit;

fourth and fifth resistances connected in a voltage divider circuit across the second voltage regulating diode;

a programmable unijunction transistior having a gate electrode connected to the junction of the timing capacitance and the third resistance, an anode electrode connected to the junction of the fourth and fifth resistances, and a cathode electrode;

a sixth resistance connected between the cathode electrode and the negative output node of the rectifier circuit;

an NPN transistor having a base electrode connected to the cathode electrode of the programmable unijunction transistor, an emitter electrode connected to the negative output node of the rectifier circuit, and a collector electrode;

a magnetic relay having a winding connected between the positive output node of the rectifier circuit and the collector of the NPN transistor;

said magnetic relay having a pair of normally closed contacts which are opened when the winding is energized and connected in series with the energization circuit;

said magnetic relay further having means for latching the relay contacts in the open position and manual reset means for reclosing the relay contacts;

a fluid lubricant pressure responsive switch having normally open contacts which are closed when the pressure responsive switch senses a fluid lubricant pressure above a predetermined pressure;

a seventh resistance connected in series with the pressure switch contacts across the junction of the first resistance and the filter capacitance and the junction of the third resistance and the timing capacitance; and said seventh resistance having a value relative to the value of the third resistance, and the first predetermined voltage having a value relating to the second predetermined voltage to discharge the timing capacitance to substantially zero charge when the pressure switch contacts are closed.

11. A motor control circuit as claimed in claim 1 wherein there is included a second resistance in series with the timing resistance and timing capacitance, and a third resistance, said loop circuit including the second and third resistances.

* * * * *